(12) United States Patent
Kunkel

(10) Patent No.: US 9,564,151 B1
(45) Date of Patent: Feb. 7, 2017

(54) DATA WRITER COIL HEATER

(71) Applicant: Seagate Technology LLC, Cupertino, CA (US)

(72) Inventor: Gary J. Kunkel, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/839,608

(22) Filed: Aug. 28, 2015

(51) Int. Cl.
*G11B 5/02* (2006.01)
*G11B 5/127* (2006.01)
*G11B 5/17* (2006.01)
*G11B 5/00* (2006.01)

(52) U.S. Cl.
CPC ......... *G11B 5/17* (2013.01); *G11B 2005/0021* (2013.01)

(58) Field of Classification Search
CPC ............. G11B 2005/0021; G11B 5/314; G11B 5/6005; G11B 5/59633; G11B 5/54; G11B 5/17; G11B 5/3903; G11B 5/41; G11B 11/0554; G11B 11/058; G11B 11/1058
USPC ......... 360/125.74, 75, 59, 313, 123.17, 128; 369/13.13, 13.33, 13.17
See application file for complete search history.

(56) References Cited

U.S. PATENT DOCUMENTS

| | | | |
|---|---|---|---|
| 4,982,408 A | 1/1991 | Shimizu | |
| 6,407,891 B1 | 6/2002 | Chang et al. | |
| 6,710,972 B1 | 3/2004 | Mochizuki et al. | |
| 6,906,893 B2 | 6/2005 | Hsiao et al. | |
| 7,375,914 B1* | 5/2008 | Dieron | G11B 5/314 360/75 |
| 7,623,322 B2* | 11/2009 | Umehara | G11B 5/6064 360/125.74 |
| 8,163,186 B2 | 4/2012 | Sasaki et al. | |
| 8,351,305 B2 | 1/2013 | Zhou et al. | |
| 8,867,323 B2* | 10/2014 | Andruet | G11B 17/32 369/112.27 |
| 9,099,112 B1 | 8/2015 | Balamane et al. | |

* cited by examiner

*Primary Examiner* — Nabil Hindi
(74) *Attorney, Agent, or Firm* — Hall Estill Attorneys at Law

(57) ABSTRACT

A data writer may suspend a transducing head from an actuator. The transducing head can consist of a writer coil positioned proximal a write pole. A protruding signal may be passed through the write coil to contact a data storage medium with the transducing head. A write signal can be passed through the write coil to write a data bit on the data storage medium.

19 Claims, 3 Drawing Sheets

DATA WRITER COIL HEATER

SUMMARY

A data writer, in accordance with various embodiments, has a transducing head suspended from an actuator. The transducing head has a writer coil positioned proximal a write pole. A protruding signal is passed through the write coil to contact a data storage medium with the transducing head.

DETAILED DESCRIPTION

Figure 1:
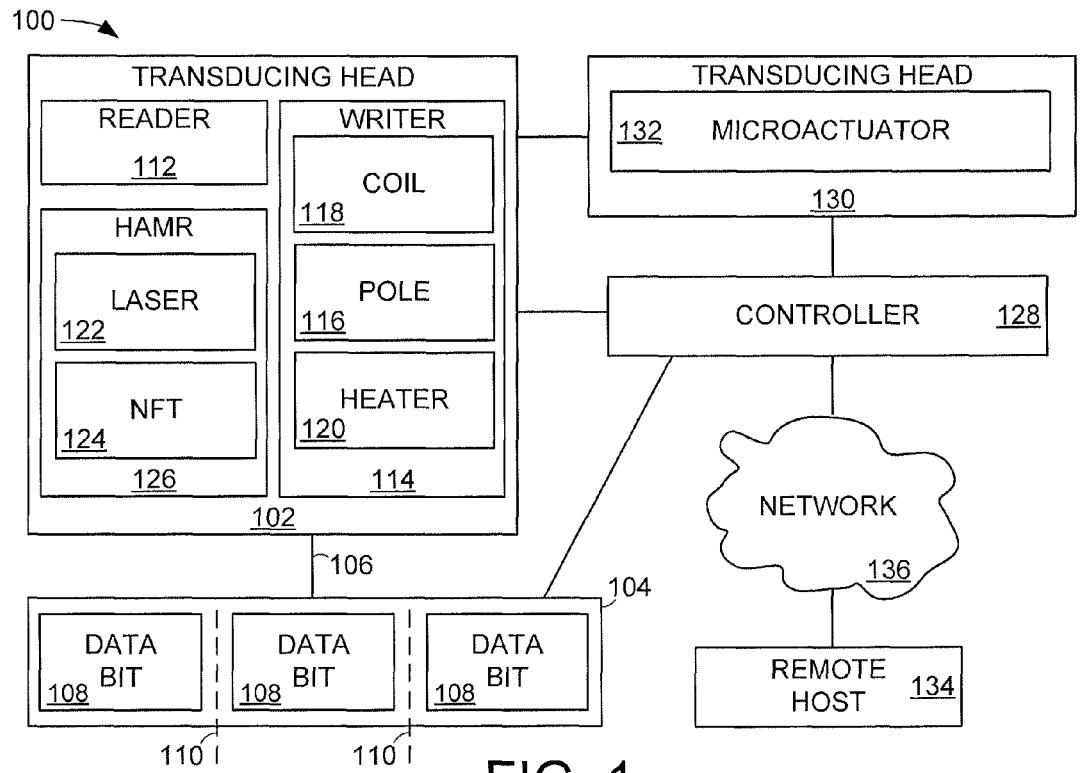
FIG. 1 is a block representation of a portion of an example data storage system configured in accordance with various embodiments.

Consumer and industry demand for data storage devices with increased data storage capacity has reduced the physical size and spacing of data storage components, such as a data writing portion of a transducing head. Such reduced physical size and spacing can decrease the real estate available for electrical connections, particularly in transducing heads with heat assisted magnetic recording (HAMR) components. Hence, various embodiments are directed to decreasing the number of electrical connections in a transducing head while maintaining functionality of the transducing head.

Accordingly, a transducing head can be suspended from an actuator and have at least a data writer with a writer coil positioned proximal a write pole. A protruding signal can be passed through the write coil to contact a data storage medium with the transducing head. The ability to utilize the write coil to adjust the position of the transducing head relative to the data storage medium allows a conventional transducing head heater to be eliminated, which optimizes the electrical connectivity of the data writer. Such a reduction in the number of electrical connections to a transducing head allows advanced data writing components, such as a HAMR laser to be implemented into a data writer without jeopardizing electrical connection malfunctions.

Although a data writer can be employed in an unlimited variety of environments and systems, various embodiments configure a data storage system 100 to utilize at least one transducing head 102 to read and write data to a data storage medium 104 separated from a transducing head 102 by an air bearing 106. The data storage medium 104 can consist of any number of data bits 108 arranged in discrete data tracks 110 which the transducing head 102 follows to allow one or more data readers 112 and data writers 114 to access data.

The data writer 114 can be an assembly of multiple components. For example, a write pole 116 can be adapted to pass magnetic flux generated by a write coil 118 to the data storage medium 104. A writer heater 120 can adjust the position of the data writer 114 and/or transducing head 102 relative to the data storage medium 104 by altering a heater current. That is, adjustment of the writer heater 120 can change the size of the air bearing 106 and the distance from the data writer 114 to the data storage medium 104 to allow writing conditions to be customized.

In some embodiments, the size of the air bearing 106 can be altered to allow at least laser 122 and near-field transducer (NFT) 124 portions of a HAMR assembly 126 heat a portion of the data storage medium 104 to allow for optimized data writing. At least one local controller 128 can direct operation of the various aspects of the transducing head 102 as well as movement of the transducing head 102 via the writer heater 120 and an actuator 130. It is contemplated that the transducing head 102 is suspended from the actuator 130 and the controller 128 dictates where the actuator 130, which may also involve a microactuator 132, such as a piezoelectric microactuator, moves to access data bits 108.

While the local controller 128 can operate independently, one or more remote hosts 134 can concurrently or individually control the transducing head 102, actuator 130, and data storage medium 104, respectively. The ability to utilize local and remote control means can allow the data storage system 100 to be implemented in a wide variety of fixed and mobile computing devices, such as smartphones, tablets, laptops, and digital music players. However, the increased sophistication of the data storage system 100 provided by the incorporation of the HAMR assembly 126 can pose difficulties in the practical construction and operation of the transducing head 102.

Figure 2A:
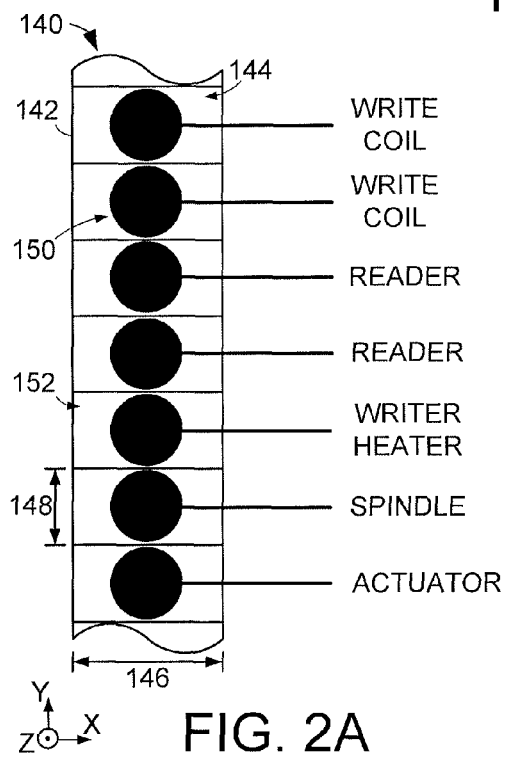
FIGS. 2A and 2B respectively illustrate line representations of portions of an example data storage system configured in accordance with some embodiments.
Figure 2B:
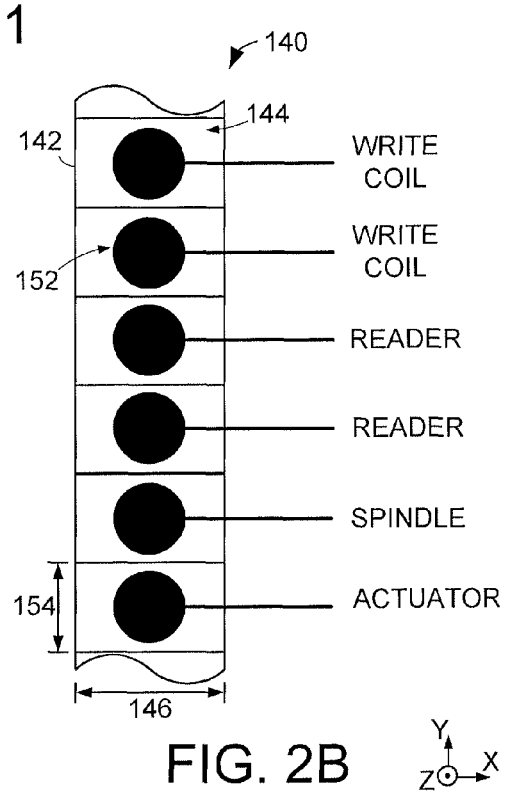

FIGS. 2A and 2B respectively illustrate line representations of portions of an example data writer 140 arranged in accordance with some embodiments. In FIG. 2A, a bond strip 142 has a plurality of bond pads 144 that respectively have a surface area defined by a length 146 and width 148. The overall surface area of the bond strip 142 can be limited by the space available on a circuit board, such as a printed circuit board assembly (PCBA) of a data storage system.

The incorporation of numerous components on a transducing head, along with an industry goal of shrinking of the physical dimensions of a data storage system as a whole, can make fabrication of accurate bond pad connections difficult. As shown, relatively small bond pads 144 do not provide much tolerance between electrical connections 150. Hence, the electrical connections 150 must be formed with precise precision, which can be time-consuming and result in high numbers of defects.

With the utilization of a write coil to manipulate the size of an air bearing and the position of a data writer relative to a data storage medium, the space occupied by the writer heater bond pad 152 in FIG. 2A can be reassigned or incorporated into the bond strip 142 to make the respective bond pads 144 physically larger, as shown in FIG. 2B In other words, the removal of at least one electrical input, such as a writer heater, allows the bond pads 144 to have an increased width 154 that is more efficiently and accurately fabricated into the electrical connections 150. Also, the removal of one more electrical inputs can allow a bond pad 144 to be reassigned without diminishing the width 148 of the respective bond pads 144.

Figure 3:
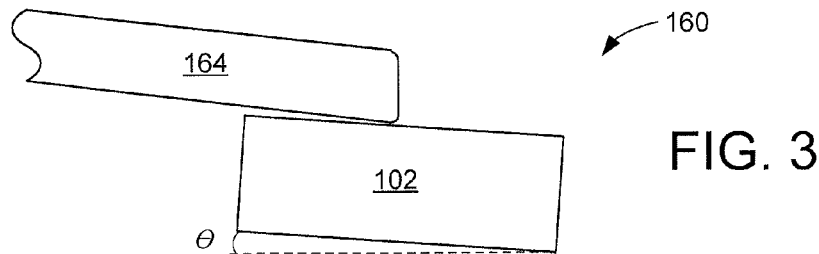
FIG. 3 shows a line representation of a portion of an example data writer arranged in accordance with various embodiments FIG. 4 displays a line representation of a portion of an example data writer configured in accordance with assorted embodiments.

FIG. 3 displays a line representation of a portion of an example data storage system 160 constructed and operated in accordance with various embodiments to utilize a writer coil in place of a writer heater. A transducing head 102 is separated from a data storage medium 104 by an air bearing 106 that can change as the medium 104 rotates in a predetermined direction, such as in response to variations in the top surface 162 of the medium 104. It is contemplated that different air bearing sizes can be set to correspond with different transducing head operations. For example, different air bearing sizes may respectively correspond to data writing, data reading, or a standby system setting.

To provide a predetermined air bearing size, as measured along the Z axis, a write coil of the transducing head 102 can be overdriven with voltage to induce change in the suspension 164 that alters the size of the air bearing 106. The suspension 164 and transducing head 102 can be configured so that overdriving the data writer write coil induces different pitch angles (θ). It is to be understood that the term "overdriving" herein corresponds with a greater voltage than that used to write data bits 108. Overdriving a write coil beyond what is needed to write a data bit 108 increases power dissipation in the transducing head 102 and alters the air bearing 106. Such overdriving can bring portions of the transducing head 102 in contact with the top surface 162, which can be used before, during, and after data writing operations to gauge and verify the size of the air bearing 106.

It is noted that overdriving a write coil to alter the position of the transducing head 102 relative to the data storage medium 104 can complicate sophisticated data writing features, such as heating the data storage medium 104 with HAMR components. For instance, increased write coil voltage may heighten the temperature of the write coil proximal an air bearing surface of the transducing head 102, which can degrade the performance of a near-field transducer portion of a data writer. Hence, various embodiments are directed to altering the write coil to allow overdriving without degrading HAMR operation.

Figure 4:
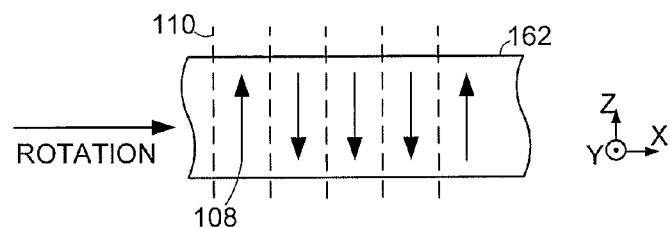
Figure 4:
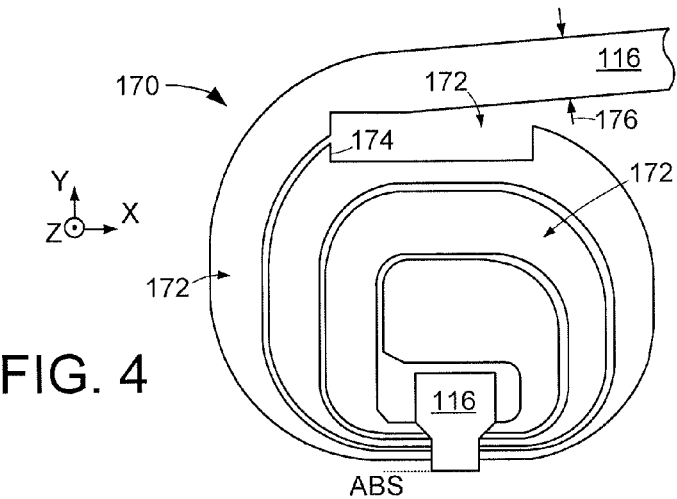

FIG. 4 shows a top view line representation of a portion of an example data writer 170 configured to lower write coil temperatures proximal the ABS when the write coil is overdriven with voltage. The write coil 118 is constructed with a notch 172 positioned distal the ABS. The notch 172 has a plurality of linear sidewalls 174 that can be arranged to be an unlimited variety of sizes and shapes that decrease the thickness 176 of at least one turn 178 of the write coil 118. In some embodiments, one or more notches 172 decrease the thickness 176 of adjacent portions of different coil turns 178. In other embodiments, the notch 172 is partially or completely curvilinear to provide an oval, circular, or other shape that reduces the amount of write coil 118 material distal the ABS.

The position and size of the notch 172 can be tuned to provide at least a temperature gradient profile from the ABS that optimizes HAMR performance while the write coil 118 is used to alter the size of the air bearing. It is contemplated that the incorporation of at least one notch 172 can maintain NFT temperatures at the ABS below 100° C., such as 70° C. The reduction in NFT temperature at the ABS can increase the resolution of HAMR operation by efficiently creating a sharp heating gradient.

Figure 5:
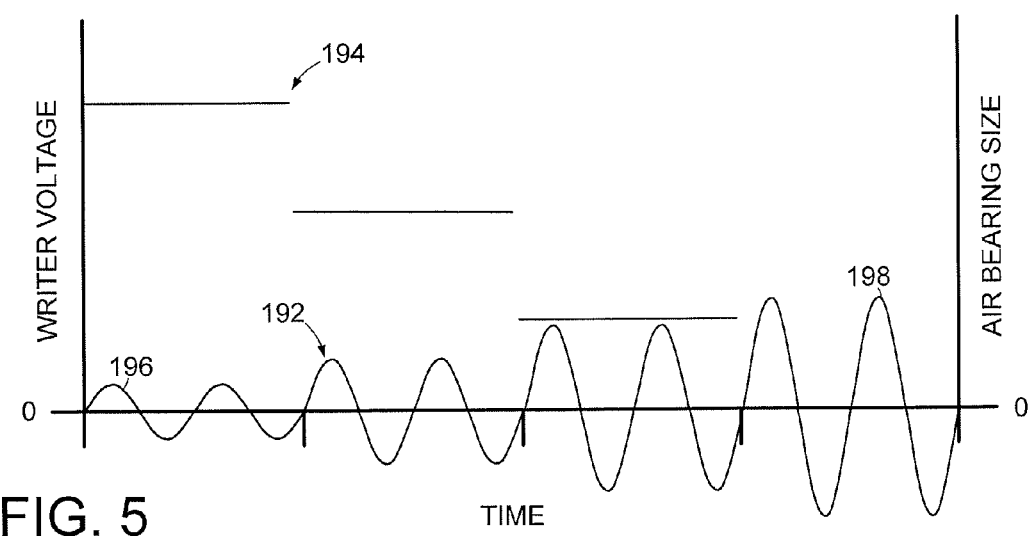
FIG. 5 plots operational data for an example data writer constructed and operated in accordance with some embodiments.

Although not limiting or required, FIG. 5 plots operational data associated with an example data writer in accordance with some embodiments. Solid lines 192 respectively represent different voltage amplitudes passed through a write coil to produce different air bearing sizes, as illustrated by segmented lines 194. As shown, increasing the amplitude of the write coil voltage progresses to decrease the size of the air bearing. It is contemplated that different voltage frequencies can be utilized, but such operation is not required.

The various write coil voltages 192 can, in some embodiments, correspond with different data writing powers. For example, a first voltage amplitude 196 can be sufficient to write data, which can be characterized as a "write signal," while a second voltage amplitude 198 overdrives the write coil to induce alteration in the size of an air bearing, which can be characterized as a "protruding signal." The ability to selectively write data alone with the first voltage 196 and/or while the coil is overdriven with the second voltage 198 allows a diverse variety of operational capabilities that can provide optimized data writing performance. That is, at least one data bit can be written by passing a write current through a write pole with or without the write coil being overdriven.

Figure 6:
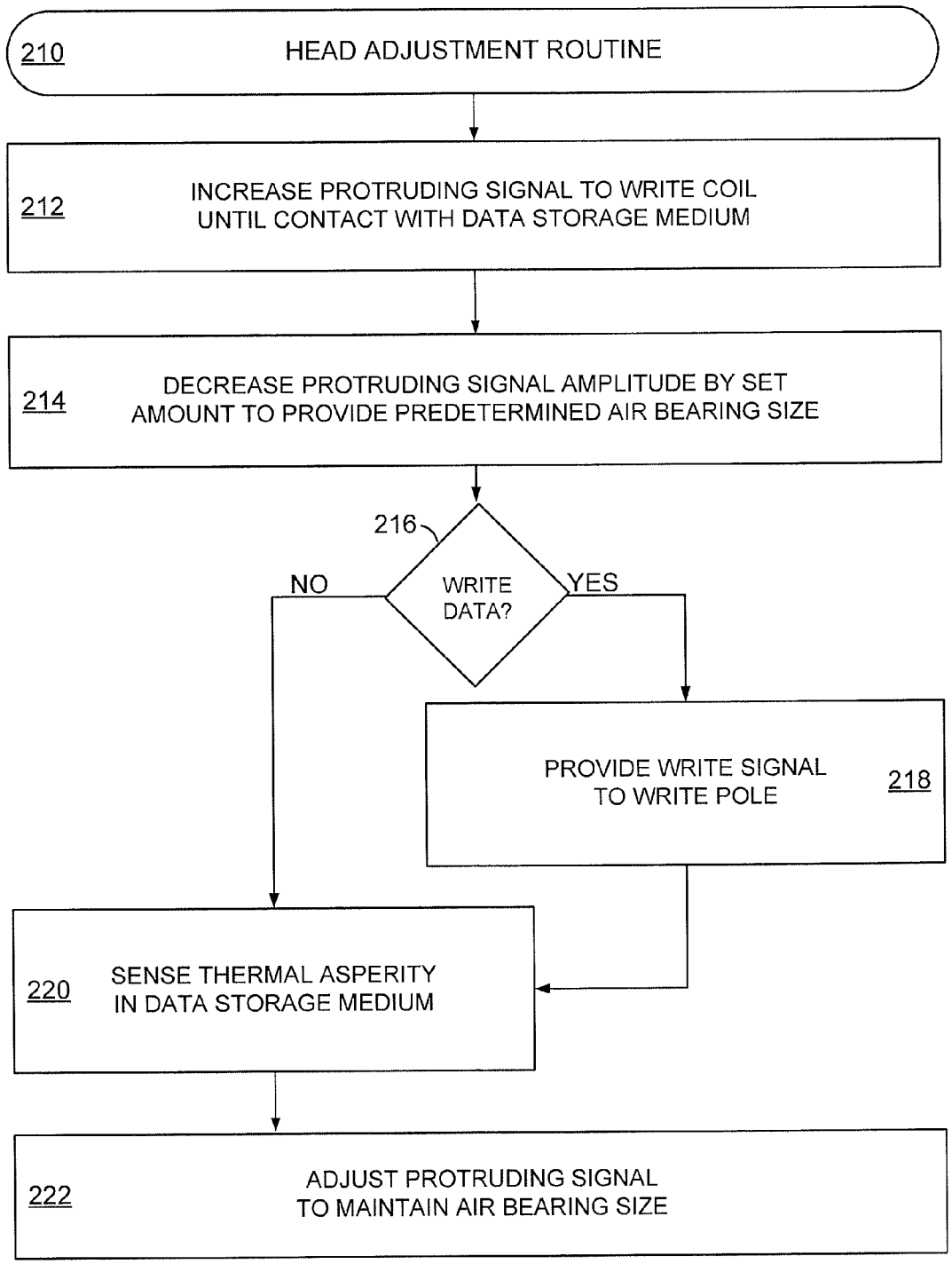
FIG. 6 is a flowchart of an example head adjustment routine carried out in accordance with various embodiments.

FIG. 6 is a flowchart of an example head adjustment routine 210 that can be carried out in accordance with various embodiments. The routine 210 begins by providing a signal to the write coil, such as a voltage at a known frequency. The signal can be gradually or immediately increased in step 212 until the transducing head contacts the data storage medium. The contact in step 212 may be for any length of time, such as less than a second or continually for multiple seconds. It is contemplated that the protruding signal increases via greater signal amplitude.

Once contact has been detected between the transducing head and data storage medium, step 214 decreases the protruding signal amplitude by a set amount to provide a predetermined air bearing size. The set amount may be attained by a single reduction in signal amplitude or through a series of gradually decreasing signals over time. At the conclusion of step 214, the transducing head is separated from the data storage medium by a predetermined distance that may be the same, or different, for various transducing head operations, such as data reading or data writing.

Decision 216 evaluates if data is to be written at the air bearing size provided in step 214. If so, step 218 proceeds to provide a write signal to the write pole to create a magnetic flux circuit through the data storage medium to write at least one data bit. It is noted that the write signal can have a smaller amplitude than the protruding signal. During or after writing data in step 218, step 220 senses an adjustment trigger, such as a thermal asperity on the data storage medium. It is contemplated that step 220 can utilize any number and types of sensors and/or detection techniques to identify an adjustment trigger. For instance, an optical sensor or bit error rate signal can be utilized to detect if and when an air bearing size should be adjusted.

Next, step 222 adjusts the protruding signal provided to the write coil to maintain at least a minimum air bearing size. It is contemplated that step 222 adjusts the protruding signal to increase or decrease the size of the air bearing. It is further contemplated that the protruding signal may be decrease to, or below, a write signal amplitude provided to the write coil. It is noted that the various aspects of routine 210 can be change or removed and any number of steps and decisions can be added, without limitation. For instance, a step may be added to adjust the signal amplitude to the write coil and the size of the air bearing to park the transducing head for short or long-term inoperability, such as a standby mode for a data storage system.

Through the assorted embodiments of the present disclosure, a write coil is utilized to manipulate the size of an air bearing between a transducing head and a data storage medium. Such utilization eliminates a writer heater and allows electrical connections to be made more efficiently and accurately, particularly in data storage systems with reduced physical dimensions. Although overdriving a write coil to alter the size of an air bearing can produce more heat at the ABS, the write coil can be tuned with one or more notches to provide a heat gradient profile from the ABS that is conducive to HAMR data bit writing via a laser and NFT.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a transducing head suspended from an actuator, the transducing head comprising a writer coil positioned proximal a write pole and configured as a continuous loop extending from an air bearing surface (ABS) of the transducing head, the transducing head positioned in contact with a data storage medium in response to a protruding signal passing through the write coil.

2. The apparatus of claim 1, wherein the transducing head comprises a laser as part of a heat assisted magnetic recording (HAMR) structure.

3. The apparatus of claim 1, wherein the write coil has a notch positioned distal the ABS.

4. The apparatus of claim 3, wherein the notch is separated from the ABS by multiple writer coil turns.

5. The apparatus of claim 3, wherein the notch has a rectangular shape with a plurality of continuously linear sidewalls.

6. The apparatus of claim 1, wherein the notch reduces first and second thicknesses of first and second turns of the writer coil.

7. A method comprising:
 suspending a transducing head from an actuator, the transducing head comprising a writer coil positioned proximal a write pole and configured as a continuous loop extending from an air bearing surface (ABS) of the transducing head;
 passing a protruding signal through the write coil; and
 contacting a data storage medium with the transducing head in response to the protruding signal passing through the write coil.

8. The method of claim 7, wherein the protruding signal has an increasing amplitude over time.

9. The method of claim 8, wherein the protruding signal is adjusted to a second amplitude to separate the transducing head from the data storage medium.

10. The method of claim 7, wherein the protruding signal is adjusted to maintain a separation distance between the transducing head and the data storage medium.

11. The method of claim 7, wherein the protruding signal is adjusted to contact the data storage medium with the transducing head for less than a second.

12. The method of claim 7, wherein the protruding signal is adjusted in response to a transducing head temperature.

13. The method of claim 7, wherein the protruding signal is greater than a write signal corresponding to writing a data bit on the data storage medium.

14. A method comprising:
 suspending a transducing head from an actuator, the transducing head comprising a writer coil positioned proximal a write pole and configured as a continuous loon extending from an air bearing surface (ABS) of the transducing head;
 passing a protruding signal through the write coil;
 contacting a data storage medium with the transducing head in response to the protruding signal passing through the write coil; and
 writing a data bit on the data storage media by passing a write signal through the write coil.

15. The method of claim 14, wherein the protruding signal is an alternating current voltage with a greater amplitude than the write signal.

16. The method of claim 14, wherein the write signal is passed through the write coil while the transducing head is separated from the data storage medium.

17. The method of claim 16, wherein the write signal is less than the protruding signal.

18. The method of claim 14, wherein the transducing head does not have an independent heater circuit.

19. The method of claim 14, wherein the write coil currently alters the position of the transducing head with respect to the actuator and writes the data bit.

* * * * *